United States Patent
Citak

(10) Patent No.: US 12,382,927 B2
(45) Date of Patent: Aug. 12, 2025

(54) TOY FOR ANIMALS, IN PARTICULAR DOGS OR CATS

(71) Applicant: Andrzej Citak, Raasdorf (AT)

(72) Inventor: Andrzej Citak, Raasdorf (AT)

( * ) Notice: Subject to any disclaimer, the term of this patent is extended or adjusted under 35 U.S.C. 154(b) by 340 days.

(21) Appl. No.: 17/928,354

(22) PCT Filed: May 28, 2021

(86) PCT No.: PCT/AT2021/060185
§ 371 (c)(1),
(2) Date: Nov. 29, 2022

(87) PCT Pub. No.: WO2021/237264
PCT Pub. Date: Dec. 2, 2021

(65) Prior Publication Data
US 2023/0345911 A1 Nov. 2, 2023

(30) Foreign Application Priority Data
May 29, 2020 (AT) .............................. A 50473/2020

(51) Int. Cl.
*A01K 15/02* (2006.01)
(52) U.S. Cl.
CPC .................................. *A01K 15/025* (2013.01)
(58) Field of Classification Search
CPC ........................... A01K 15/025; A63F 9/0601
USPC ..................... 446/81, 265; 119/702, 707, 711
See application file for complete search history.

(56) References Cited

FOREIGN PATENT DOCUMENTS

| DE | 202006010218 U1 | | 11/2006 | | |
|---|---|---|---|---|---|
| DE | 202008002903 U1 | * | 7/2008 | ........... | A01K 15/025 |
| DE | 202008003153 U1 | * | 7/2008 | ........... | A01K 15/025 |
| DE | 202009016965 U1 | * | 4/2010 | ........... | A01K 15/025 |
| GB | 2482142 A | * | 1/2012 | ........... | A01K 15/025 |

OTHER PUBLICATIONS

Trixie Mad Scientist Turn Around Dog Puzzle Toy, Intermediate (Level 2) Strategy Game, Dog Activity Treat Toy for Dogs, www.amazon.com (Date First Available: Jun. 21, 2012).*

(Continued)

*Primary Examiner* — Peter M Poon
*Assistant Examiner* — Danielle A Clerkley
(74) *Attorney, Agent, or Firm* — Laurence A. Greenberg; Werner H. Stemer; Ralph E. Locher

(57) ABSTRACT

A toy for promoting the intelligence of animals, in particular dogs or cats, has a base, a connection element, and holding elements, which protrude from the base, and at least one elongated hollow body which is closed at one end and open at another end and into which small-sized animal treats can be inserted. The hollow body is tiltably arranged on the connection element about the longitudinal axis of the connection element so that the closed end of the hollow body lies on the upper face of the base in a starting state, the closed end of the hollow body is tilted away from the base upon being actuated by the animal, the hollow body returns to the starting state automatically, and a sound can be generated as a result of the closed end of the hollow body striking the upper face of the base.

20 Claims, 5 Drawing Sheets

(56) References Cited

OTHER PUBLICATIONS

Loobani Dog Puzzle Toys Wooden—Interactive Toys for Boredom, IQ Training and Mental Brain Stimulation, Treat Dispensing and Entertainment Toys/Food Slow Feeder for Small to Large Dog, www.amazon.com (Date First Available: Dec. 11, 2019).*

Trixie Vario Poker Box 2 Dog Puzzle Toy, Intermediate (Level 2) Strategy Game, Dog Activity Treat Toy for Dogs, www.amazon.com (Date First Available: Jun. 26, 2019).*

Sunnydogs Brand, "Sunnydogs Intelligence Game Dog Piano, Dog Toy with Reward, Combination Game, Motivational Toy: Amazon.de: Pet", Sep. 22, 2016 (Sep. 22, 2016), p. 1-7, Retrieved from: URL:https://www.amazon.de/Intelligenzspiel-Hundeklavier-Hundespielzeug-Belohnung-Kombinationsspiel/dp/B01LYL4W14, XP055819524, [found on Jun. 30, 2021], the whole document.

* cited by examiner

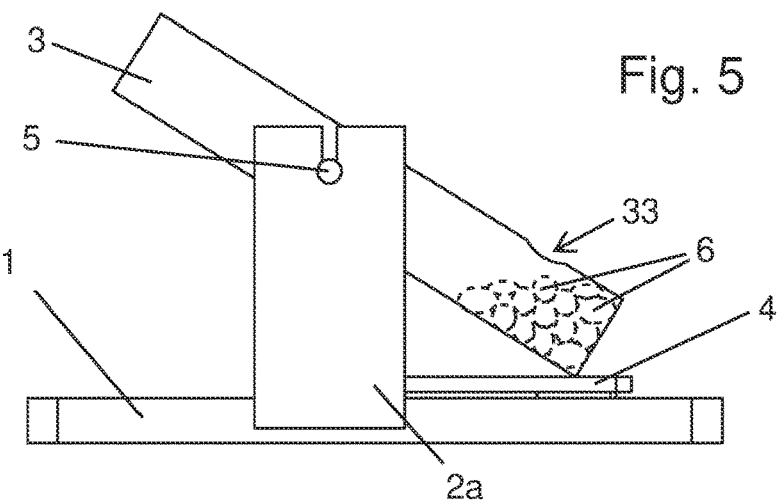
Fig. 5
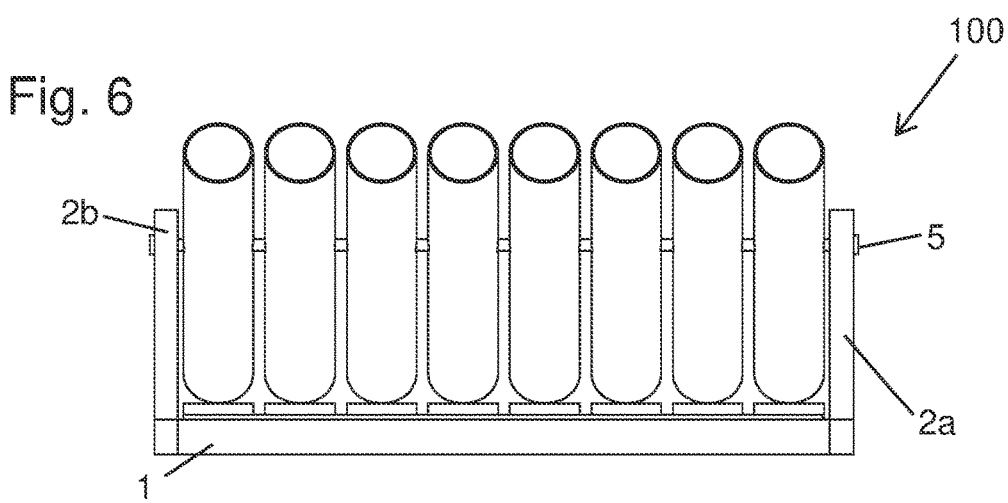
Fig. 6
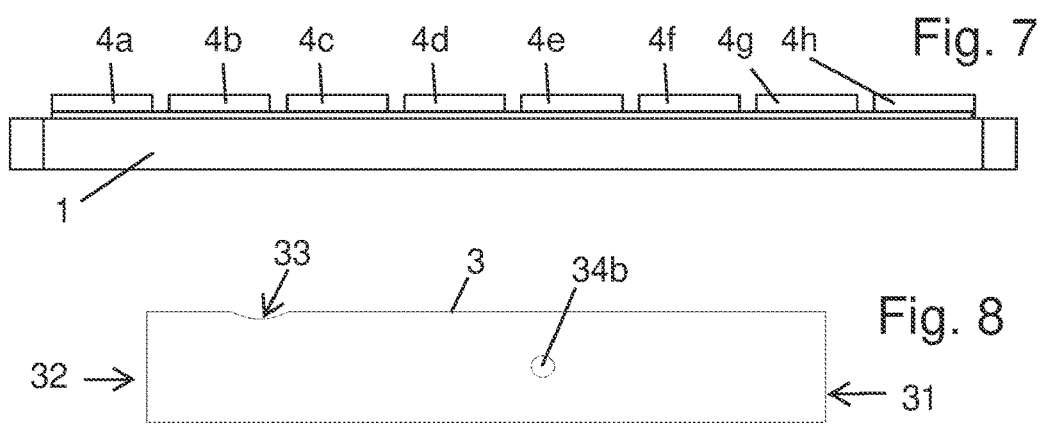
Fig. 7
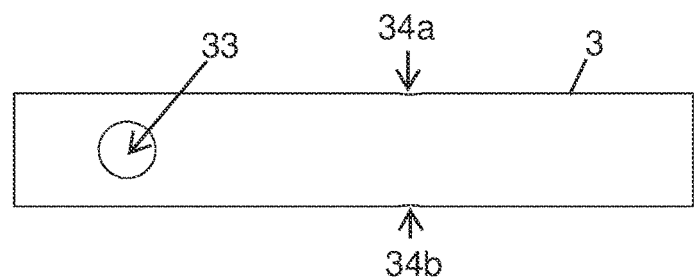
Fig. 8
Fig. 9

TOY FOR ANIMALS, IN PARTICULAR DOGS OR CATS

FIELD AND BACKGROUND OF THE INVENTION

Various toys for animals are known from the prior art, in which food or animal treats are released as a reward after successfully completing the game. In most cases, small plates under which the animal delicacies are hidden are to be moved with the snout or paws or, for example, boxes filled with animal delicacies are to be opened. From WO 2014/089595 A1, for example, a dog toy in the form of a sliding puzzle is known, in which the platelets can be shifted in two directions normal to one another in order to get to the food hidden underneath.

A disadvantage of these known devices is that the delicacies hidden therein can consistently be obtained by moving them with the snout or paws, so that only a limited learning effect can be achieved with the animal and the games become uninteresting for the animal after a short time.

From DE 202006010218 U1 a dog toy with a variable plug-in or screw system is known, in which a bottle filled with animal treats or treats is rotatable through 360° around a horizontal axis and the dog must pull on a rope arranged around the neck of the plastic bottle in order to rotate the bottle into a position in which an animal treat falls out of the bottle.

The disadvantage of the known dog toy with the rotatable bottle is that the dog must turn the bottle with a string and, in this case, there is a great risk that the toy will quickly become unusable, especially if the dog pulls on the string with its teeth or claws. Another disadvantage is that all the treats fall out of the bottle at the same time when the dog turns it into a vertical position, so the learning effect for the animal is minimal and the game becomes uninteresting in a short time.

SUMMARY OF THE INVENTION

The object of the invention is therefore to provide a toy for animals which demands from an animal a degree of dexterity, which exceeds that necessary for the known sliding games and keeps the animal occupied and interested over a longer period of time, while at the same time it is robustly constructed.

The invention solves this problem with a toy for promoting the intelligence of animals, in particular dogs or cats, with the features as claimed. According to the invention it is provided that the toy comprises the following components:
- a base plate, an, in particular elongate, connecting element and holding elements arranged projecting from the base plate for supporting the connecting element and
- at least one elongated hollow body, closed at one end and open at one end, into which small-sized animal treats can be inserted, wherein the at least one hollow body is arranged and designed on the connecting element such that it can be rotated or tilted about the longitudinal axis of the connecting element,
  - that the closed end of the hollow body rests in an initial state on the top of the base plate,
  - that the closed end of the hollow body tilts upwards away from the base plate when actuated by the animal,
  - that the hollow body, in particular after an actuation by the animal for removing an animal treat in the area of the open end of the hollow body, returns to the initial state automatically, in particular under the effect of gravity, and
  - that a noise can be generated by the impact of the closed end of the hollow body on the top of the base plate.

This embodiment of a toy according to the invention ensures on the one hand that the animal remains busy and interested over a long period of time, since the hollow body repeatedly returns to its original state on its own, which makes it difficult for the animal to actuate the hollow body with, for example, the paw or the snout in order to remove animal treats in the area of the open end. A complete removal of all delicacies at once is also avoided by the independent return to the initial state. In addition, the animal's intelligence is promoted by the fact that the animal must establish a connection between the rotation of the hollow body and the delivery of the animal treats, which is a complex task for the animal. Furthermore, the animal's intelligence is promoted by the fact that when the closed end of the hollow body hits the base plate, a noise is generated, and the animal establishes a connection between the return to the initial state, in which it cannot take any animal treats, and the impact of the hollow body on the base plate. In connection with the invention, a hollow body is understood to mean any hollow body that is open at one end and closed at the other end, so that animal treats can be stored therein, and which is suitable for being arranged on a connecting element.

In connection with the invention, a connecting element is understood to mean any element which is suitable to be arranged between two holding elements and to carry a hollow body which is filled with animal treats. For example, these can be elongated, rod-shaped or wire-shaped connecting elements.

Further advantageous configurations of the toy are described in the features of the dependent claims:

An embodiment of the toy that is particularly robust in terms of mechanical stress from the animal can be provided if two holding elements arranged opposite one another on the base plate and protruding perpendicularly from the base plate are provided, the holding elements being connected to one another by means of the connecting element, in particular a rod element.

A toy with a particularly simple construction can be provided if the hollow body is arranged on the connecting element in the manner of a rocker, with the closed end of the hollow body resting on the base plate in the initial state and the open end being spaced from the base plate.

In order to make it easier for the animal to remove animal treats in the area of the open end of the hollow body, it can be provided that the at least one hollow body, when actuated by the animal in particular with a paw or the snout, is in an eating position against the effect of gravity around the connecting element is tiltable, the open end of the hollow body in the eating position rests on the top of the base plate, so that animal treats located inside the hollow body move out of the hollow body following the effect of gravity.

This advantageous embodiment of the toy can ensure that the animal receives a certain amount of help in removing the animal treats, since the open end of the hollow body rests on the top of the base plate and the animal can thus hold the hollow body more easily. In order to further promote the intelligence of the animal or the interest of the animal in the toy, it can be provided
- that at least one sound element arranged on the top of the base plate is flat, in particular plate-shaped, preferably with a rectangular base, and that the sound element is arranged on the top of the base plate in the support area of the closed end of the hollow body.

Such a sound element makes it easier for the animal to establish a connection between the impact of the hollow body on the base plate or on its upper side, which promotes intelligence. In addition, the animal's interest is aroused by the tones generated by the sound element.

A way to keep animals playing with the toy busy and interested for a particularly long period of time can be provided, if
the toy comprises a large number of hollow bodies which are arranged next to one another,
the toy comprises a plurality of separate sound elements arranged next to one another on the top of the base plate, and
the individual hollow bodies on the connecting element and the individual sound elements on the top of the base plate are each arranged in such a way that each hollow body is assigned a sound element.

The animal's interest in the toy can be further increased if the individual sound elements each have different lengths and/or different tones or pitches.

The interest of the animal can be aroused in a particularly simple manner if the sound elements are arranged between the holding elements according to increasing length, in particular as in the case of a xylophone.

In order to provide sound elements that on the one hand generate interesting noises or tones for the animal and on the other hand to avoid the sound elements being damaged quickly or the animal being poisoned while playing, it can be provided that each sound element consists of wood or metal or a metal alloy. So that pets such as dogs or cats are not poisoned when playing with the toy, it can advantageously be provided that the base plate and/or the holding elements and/or the connecting element and/or the individual hollow bodies are each made of non-toxic materials, in particular wood, plastic or metal.

Particularly robust hollow bodies, which can be easily operated by the animal, can be provided if each hollow body has a cylindrical shape, in particular with an elliptical or circular cross-section, or a prismatic shape, in particular with a square, rectangular, hexagonal or octagonal cross-section.

In order to enable the animal to sniff out where animal delicacies are hidden, in particular if several hollow bodies are present, it can be provided that selected, in particular all, hollow bodies in the area of the closed end each have an, in particular circular, olfactory opening through which the smell of animal treats placed in the hollow body can be smelled.

In this way, the animal can sniff out which hollow bodies contain rewards and thus recognize which hollow bodies must be actuated in order to remove animal treats at their open end.

In order to ensure particularly easy access to the respective olfactory opening for the animal, it can be provided that the olfactory opening is arranged in the lateral surface of the respective hollow body, whereby it is provided in particular that the center of the olfactory opening is arranged at a distance from the closed end of 15-40% of the length of the hollow body.

A particularly simple fixation of the respective hollow body on the connecting element can be achieved if two openings are arranged opposite one another in the lateral surface of each hollow body, in particular at the same height, for the passage of the connecting element, the openings being offset from the center of gravity of the respective hollow body in the direction of the open end of the respective hollow body.

A particularly simple fixation of the respective hollow body on the connecting element can be achieved if two openings are arranged opposite one another in the jacket surface of each hollow body, in particular at the same height, for the passage of the connecting element, the openings being offset from the center of gravity of the respective hollow body in the direction of the open end of the respective hollow body.

In order to ensure a simple tilting of the hollow body around the connecting element by the animal, it can be provided that the center of the openings is arranged in each case at a distance from the open end of 25-45% of the length of the respective hollow body.

The fact that the animal can tip the hollow body particularly easily with its snout or paw, but at the same time reliably return it to its initial state, can be achieved in that the distance between the open end of the hollow body and the pivot point of the hollow body around the connecting element is smaller than the distance between the pivot point and the closed end of the hollow body.

In order to prevent the hollow body from being tilted or rotated by the animal beyond the eating position, e.g. rotated under the connecting element, it can be provided in a toy according to the invention on the one hand that the distance between the open end of the hollow body and the pivot point of the hollow body around the connecting element is greater than the distance between the pivot point and the base plate.

On the other hand, in order to prevent the hollow body from being tilted or rotated by the animal beyond the eating position, e.g. rotated through under the connecting element, it can also be provided in a toy according to the invention that the distance between the open end of the hollow body and the pivot point of the hollow body around the connecting element is smaller than the distance between the pivot point and the base plate and that a stop element is provided to prevent the hollow body from spinning.

A simple removal of animal treats by the animal in the eating position, with the toy at the same time ensuring that the hollow body reliably and independently returns to the starting position, can be achieved if the hollow body encloses an angle of 25° to 60° with the base plate in the initial state and/or that the hollow body encloses an angle of 45° to 90° with the base plate in the eating position.

A mechanically particularly stable toy that can be easily dismantled at the same time to clean the individual parts can be provided if the connecting element, in particular the rod element, is connected, in particular reversibly, to the end region of the respective holding element remote from the top of the base plate.

In an advantageous embodiment it can be provided that an elongated recess is arranged in the top of the base plate in the area in which the open end of the respective hollow body strikes the base plate in the eating position. In order to promote the intelligence of the animal particularly intensively and keep the animal busy with the toy for a particularly long time, the recess can have a pin receiving recess and undercuts for holding plug-in locking pegs or locking hats that engage in the undercuts. In this case, only a limited area of these pin receiving recesses is respectively free of undercuts, and only after moving the respective locking peg or hat there is the animal free to remove the respective locking peg or hat and insert the hollow body in the feeding position so that the animal can receive the animal treats that are present in the hollow body.

The toy can be designed to be particularly interesting for the animal if the at least one locking peg or the at least one locking hat additionally has at least one central olfactory channel fully penetrating it, through which the animal treats placed in the recess and located under the locking peg can be smelled. In order to receive the animal treat the animal must move the locking peg into the pin receiving recess so that it can remove the locking peg.

The toy can be designed to be particularly demanding for the animal if at least one locking roller is provided that can be inserted into the at least one pin receiving recess. If such locking rollers are present, the animal must first remove the locking roller to be able to move the locking pegs, in order to then be able to bring the hollow bodies into the eating position and to receive the animal treats contained therein. Optionally, such a locking roller can also have at least one central olfactory channel which fully penetrates it and via which animal treats placed in the recess and located under the locking roller can be smelled.

Further advantages and embodiments of the invention emerge from the description and the accompanying drawings.

Exemplary embodiments of the invention are shown schematically in the drawings and are described by way of example below with reference to the drawings.

BRIEF DESCRIPTION OF THE FIGURES

FIG. 5 shows a side view of the first exemplary embodiment from FIG. 1, FIG. 6 shows a perspective view of the first exemplary embodiment from FIG. 1, FIG. 7 shows a perspective view of the base plate with sound elements from FIGS. 3 and 4, FIGS. 8 and 9 show detailed views of a hollow body of the first exemplary embodiment from FIG. 1.

DETAILED DESCRIPTION OF THE INVENTION

Figure 1:
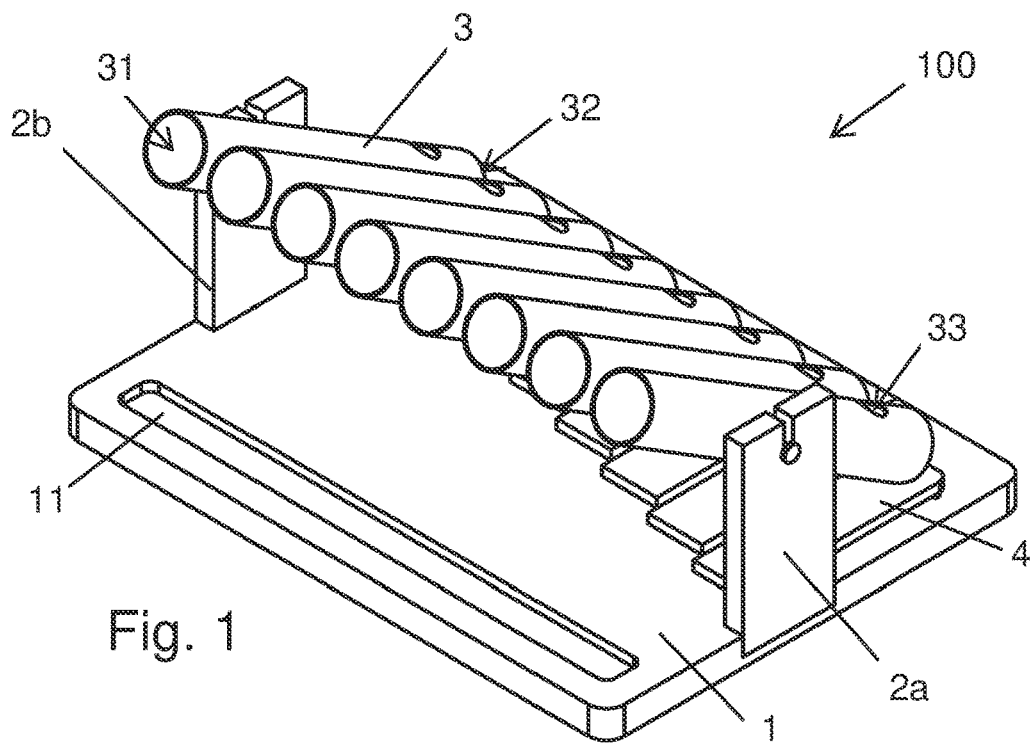
FIG. 1 is a perspective view of a first embodiment of a toy according to the invention for animals.
Figure 2:
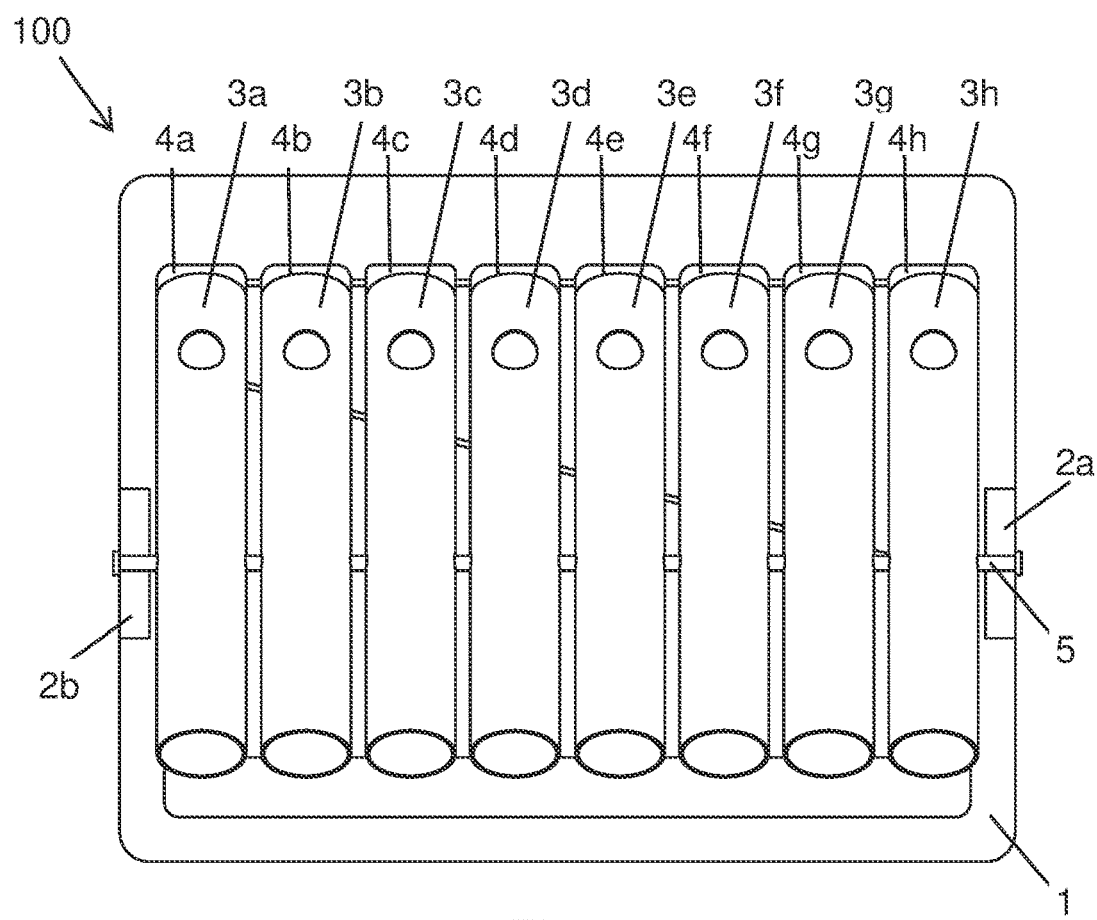
FIG. 2 shows a plan view of the first exemplary embodiment from FIG. 1.

FIG. 1, FIG. 2, FIG. 5 and FIG. 6 show different views of a first exemplary embodiment of a toy 100 according to the invention for promoting the intelligence of animals, for example domesticated animals such as dogs or cats. The base plate 1 of the toy 100 is rectangular in the first exemplary embodiment and two holding elements 2a, 2b protruding perpendicularly from the base plate 1 are arranged on its shorter sides, parallel opposite one another. In the first embodiment, the two holding elements 2a, 2b are designed as rectangular plates, which, as in the first embodiment, can be glued or glued in recesses on the side of the base plate 1 (cf., FIGS. 3 and 4) or can also be screwed laterally or from above or below, to the base plate 1. The holding elements 2a, 2b are connected to one another with an elongate connecting element 5 which, in the first exemplary embodiment, is rod-shaped. The holding elements 2a, 2b each have, at their upper end, which is remote from the top of the base plate 1, a recess or notch, in which the connecting element 5 is inserted or with which the connecting element 5 is reversibly connected.

In the first exemplary embodiment, eight elongated, cylindrical hollow bodies 3a, . . . , 3h are arranged on the connecting element 5, each of which has an open end 31 and a closed end 32. Animal treats 6, as indicated schematically in FIG. 5, can be filled into the hollow bodies 3a, . . . , 3h. The number of hollow bodies 3 can, however, be freely selected in a toy 100 according to the invention, and a single hollow body 3 is also sufficient to arouse the interest of an animal and keep it occupied for a long time.

In the first embodiment, the hollow bodies 3a, . . . , 3h have a circular cross-section and they each have an olfactory opening 33, which, in each case, is arranged at the closed end 32 on the upper side of the respective hollow body 3a, . . . , 3h, which upper side, which is oriented away from the base plate 1 (see FIG. 5, FIG. 8, and FIG. 9). Through these olfactory openings 33, the small-sized animal treats 6, which are inserted into the hollow body 3, can be sniffed out by an animal playing with the toy.

As can be seen in detail in FIG. 5 for a single hollow body 3, the individual hollow bodies 3 are tiltable or rotatable on the connecting element 5 so that they can be tilted about the longitudinal axis of the connecting element 5 when the animal, for example, with the snout or the paw presses on the hollow body 3 in the area of the open end 31.

In a basic state of the first exemplary embodiment, which is shown in FIG. 5, the closed end 32 of the hollow body 3 rests on the top of the base plate 1 and forms an angle of approximately 40° with the base plate 1. The closed end 32 of the hollow body 3 rocks when actuated by the animal in the area of the open end 31 away from the base plate 1 and can in this way be tilted so far that the hollow body 3 touches the base plate 1 in the area of the open end 31 and encloses an angle of approximately 70° with the base plate. The animal delicacies 6, which are located inside the hollow body 3, move out of the interior of the hollow body 3 following the action of gravity in this eating position. The hollow body 3 must therefore be moved by the animal against the action of gravity around the connecting element 5 in this eating position can be tilted or rocked so that the animal delicacies 6 can be removed from the animal.

In the first exemplary embodiment, the hollow body 3 is thus arranged rocker-like on the connecting element 5, the pivot point of the respective hollow body 3 being offset from the center of gravity, so that in the initial state the closed end 32 of the hollow body 3 rests on the base plate 1 and the open end 31 is spaced apart from the base plate 1, as can be seen in FIG. 1f the hollow body 3 is no longer actuated by the animal, the hollow body 3 thus automatically returns to its initial state, here following the action of gravity. The offset of the pivot point from the center of gravity can be achieved in that, as in the first exemplary embodiment, the openings 34a, 34b through which the connecting element 5 is guided are arranged so as to be offset from the center of gravity of the hollow body 3 in the direction of the open end 31 of the hollow body 3. In this way, the distance between the open end 31 of the hollow body 3 and the point of rotation of the hollow body 3 is smaller than the distance between the point of rotation and the closed end 32 of the hollow body 3.

When the hollow body 3 returns to the initial state, a region or section of the closed end 32 of the hollow body 3 strikes the top of the base plate 1, as is shown in FIG. 5. This creates a noise, which increases the animal's interest in the toy.

As shown in detail in FIG. 3, FIG. 4, FIG. 6 and FIG. 7, flat, plate-shaped sound elements 4a, . . . , 4h are arranged in the first embodiment on the top of the base plate 1, the sound elements having a rectangular base. These sound elements 4a, . . . , 4h are each located on the top of the base plate 1 in the support area of the closed end 32 of the individual hollow bodies 3a, . . . , 3h. A sound element 4a, . . . , 4h is assigned to each of the hollow bodies 3a, . . . , 3h. These sound elements 4a, . . . , 4h are in this case arranged separately next to one another on the top of the base plate 1 and are individually assigned to the individual hollow bodies 3a, . . . , 3h. This means that with each hollow body 3a, . . . , 3h only a special tone can be generated by striking one of the sound elements 4a, . . . , 4h. The individual sound elements 4a, . . . , 4h have different lengths so that they generate different tones or pitches when the closed end 32 of the hollow body 3 strikes the respective sound element 4a, . . . , 4h. As can be seen in detail in FIGS. 3 and 4, the individual sound elements 4a, . . . , 4h have different lengths and are arranged between the holding elements 2a, 2b after increasing length in the manner of a xylophone. This means that if the animal were to operate the individual hollow bodies 3a, . . . , 3h in the order from one connecting element 2a to the other connecting element 2b, the sound sequence of a scale would result in ascending or descending order, depending on the direction the animal actuates the hollow bodies 3a, . . . , 3h.

These different tones arouse the animal's interest in the toy, and it occupies itself with the toy 100 even longer than if the toy 100 had no sound elements 4, or if they had no sound elements 4 in each case.

The base plate 1, the holding elements 2a, 2b, the connecting element 5 and the hollow bodies 3a, . . . , 3h are made of wood in the first embodiment, but can also consist of other non-toxic materials such as plastic or metal. The sound elements 4a, . . . , 4h are also made of wood in the first exemplary embodiment but can also consist of metal or a metal alloy that are not toxic to animals.

Figure 3:
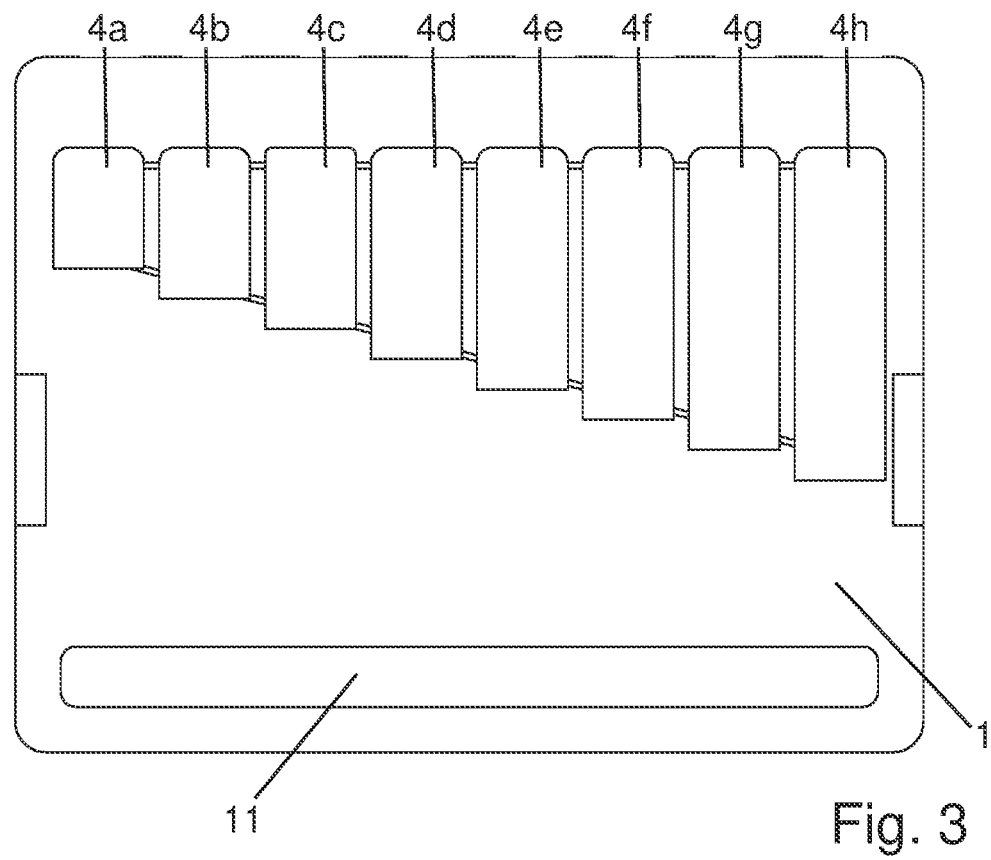
FIG. 3 shows a plan view of the base plate with sound elements of the first exemplary embodiment from FIG. 1.
Figure 4:
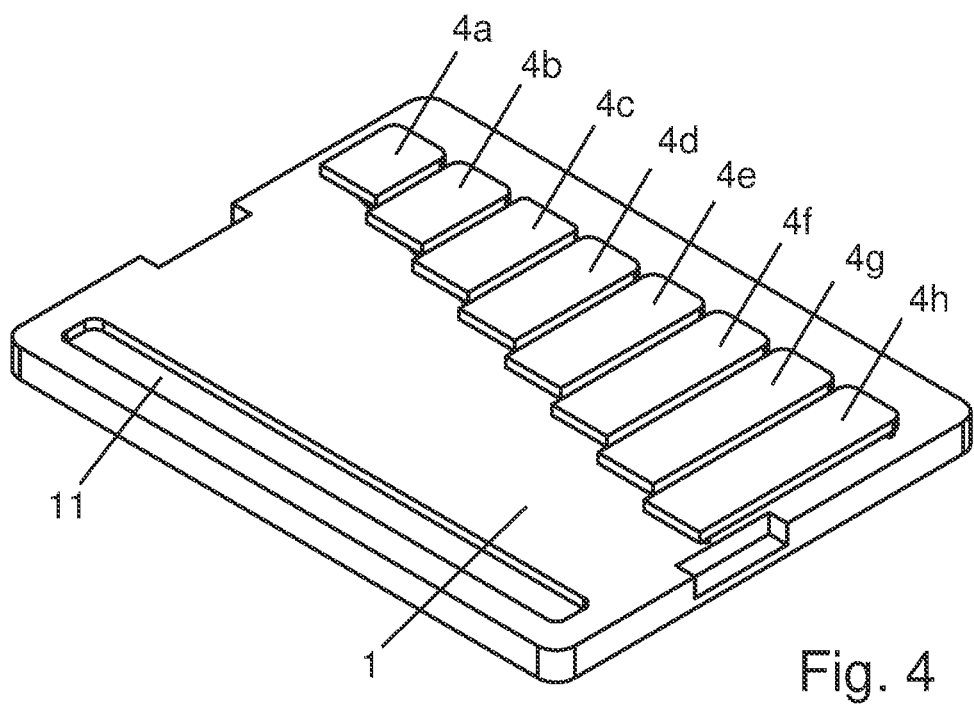
FIG. 4 shows a perspective illustration of the base plate with sound elements from FIG. 3.

As can be seen in FIG. 1 and FIG. 3, the base plate 1 can also have a recess 11, for example a milling, which extends along the top of the base plate 1, on the side opposite the sound elements 4a, . . . , 4h, so that the open end 31 of the individual hollow bodies 3a, . . . , 3h rests therein, in each case, in the eating position. Thus, animal treats 6, which roll out of the interior of the hollow body 3, remain in the recess 11, which makes it easier for the animal to eat.

In the first embodiment, the individual hollow bodies 3a, . . . 3h have a cylindrical shape with circular cross-section. This, however, is optional and a cylindrical shape with elliptical cross-section may also be provided, or even prismatic hollow bodies, which, for example, have a square, rectangular, hexagonal or octagonal cross-section. The olfactory opening 33 is also arranged in the outer surface of the hollow bodies 3a, . . . , 3h on their upper side (see FIGS. 8 and 9) and has a circular cross section. The olfactory opening 33 can, however, can also have any other shape or, for example, be arranged in the end face of the respective hollow body 3a, . . . , 3h at the closed end 32, or alternately, on the end face and in the lateral surface.

The center of the olfactory opening 33 is located in the first embodiment in the area of the first quarter of the length of the hollow body 3 in the area of the closed end 32, which is advantageous because the animal delicacies 6 are located there in the initial state, as shown in FIG. 5. The olfactory opening 33 can, however, also be arranged at a different distance from the closed end 32, for example from 15 to 40% of the length of the hollow body 3.

FIGS. 10 to 14 show a second exemplary embodiment of a toy 100 according to the invention for animals, which is designed in the same way as the first exemplary embodiment, in which, however, the removal of animal treats 6 from the hollow bodies 3a, . . . , 3h is additionally made more difficult for the animals by locking pegs 13. This design variant can be provided in any exemplary embodiment of a toy 100 according to the invention and is described in more detail below:

In the second exemplary embodiment, the recess 11 in the base plate 1 has a circular pin receiving recess 111 (see FIG. 14) at its right-hand end. Such a pin receiving recess 111 can, however, also be provided at the left end of the recess 11 or at both ends.

Figure 14:
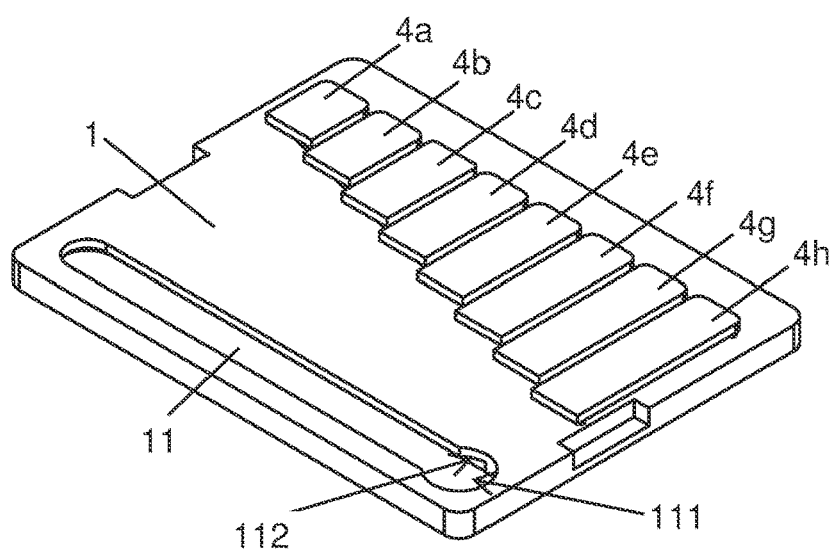
FIG. 14 shows a perspective view of the base plate with sound elements of the second exemplary embodiment from FIG. 10.

Furthermore, the recess 11 has undercuts 112 running all around (see FIG. 14). In the recess 11 configured in this way, a locking roller 12 and a locking peg 13 are arranged by way of example in the second exemplary embodiment. The locking roller 12 is essentially cylindrical with a gripping groove running all around and is inserted into the pin receiving recess 111 (see FIGS. 10, 12 and 13). The locking peg 13 has a similar shape but has a collar 131 (see FIG. 11) which engages in the undercuts 112.

Figure 12:
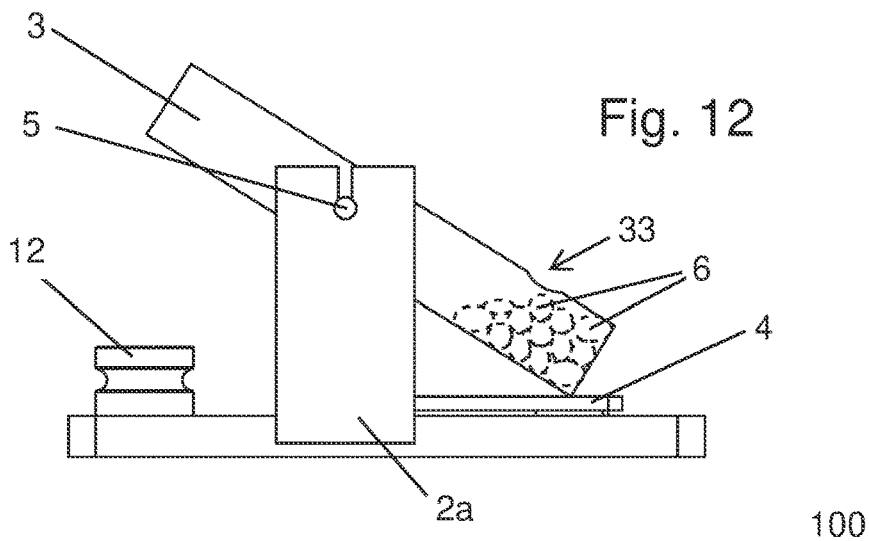
FIG. 12 shows a side view of the second exemplary embodiment from FIG. 10.
Figure 13:
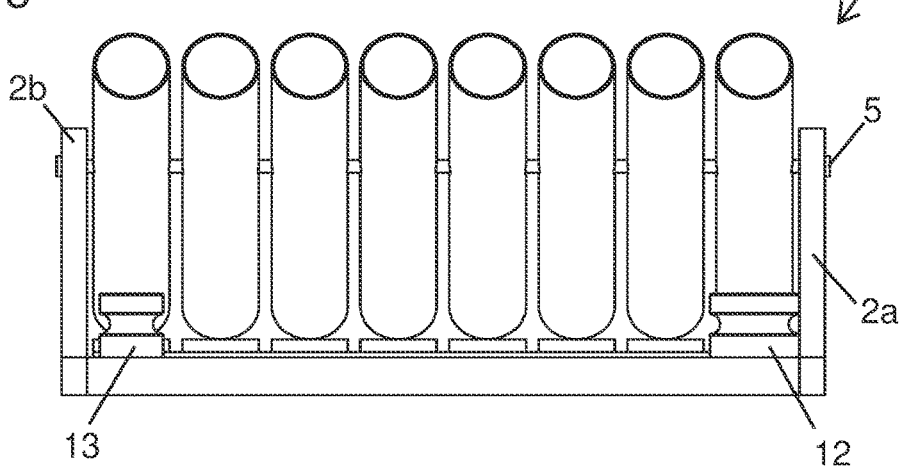
FIG. 13 shows a perspective view of the second exemplary embodiment from 8 FIG. 10.

As a result, it is initially impossible for the dog to tilt the respective hollow body 3a, . . . , 3h in front of which the locking peg 13 is in the eating position (see FIG. 12). In this case, the animal must first at least move the locking peg 13 or remove the locking roller 12 from the pin receiving recess 111, for example, poke it away with the snout or a paw, and then be able to push the locking peg 13 into the pin-receiving recess 111 and remove it as well.

In the recess 11, however, just as many locking pegs 13 can be arranged as there are hollow bodies 3a, . . . , 3h. In the second embodiment this would be eight. This means that the animal would at first have to move or remove the locking peg 13 in front of each hollow body 3a, . . . , 3h, which the animal would like to tip into the eating position.

The fact that the animal not only moves the locking pegs 13 in order to be able to tilt the individual hollow bodies 3a, . . . , 3h, but rather removes them completely, can be promoted if the locking pegs 13 and possibly also the locking rollers 12 have one central, axially continuous olfactory channel 130 or 120, through which the odor of an animal treat 6 lying under the respective locking peg 13 or the respective locking roller 12 in the pin receiving recess 111 can be smelled. For this purpose, the locking peg 13 or the locking roller 12 can have a corresponding receptacle for animal treats 6 on their underside.

Figure 10:
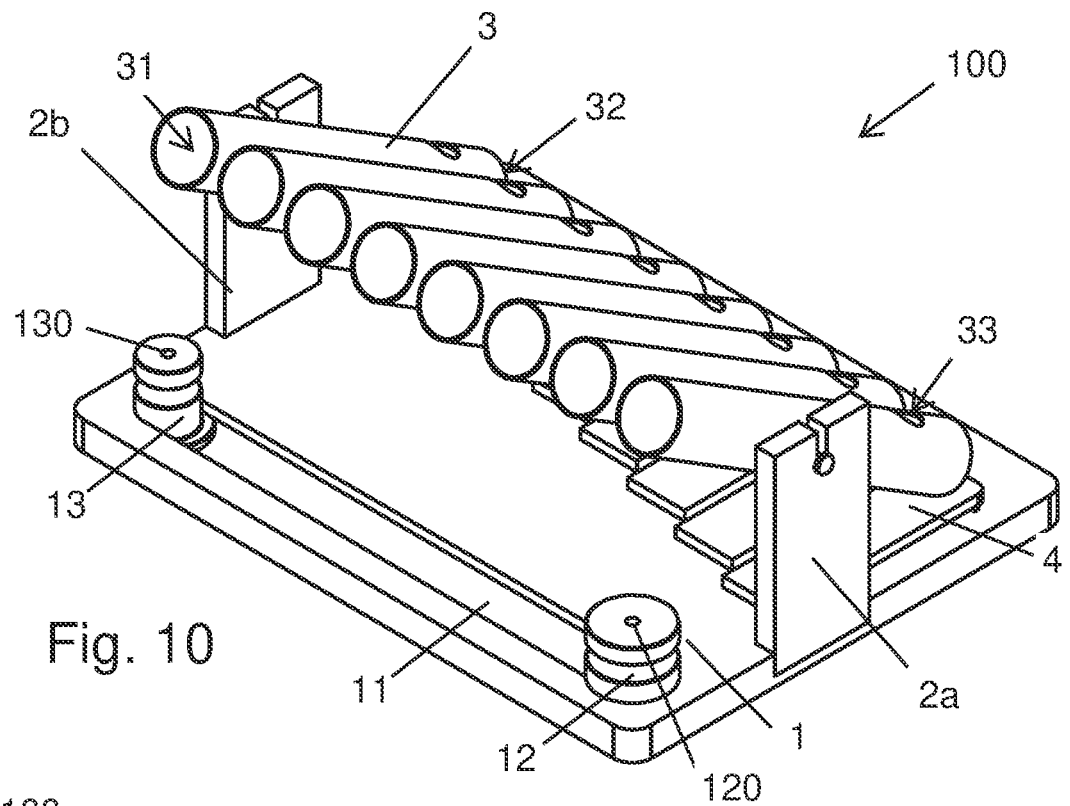
FIG. 10 shows a perspective illustration of a second exemplary embodiment of a 4 toy for animals according to the invention with a locking peg and a locking roller.
Figure 11:
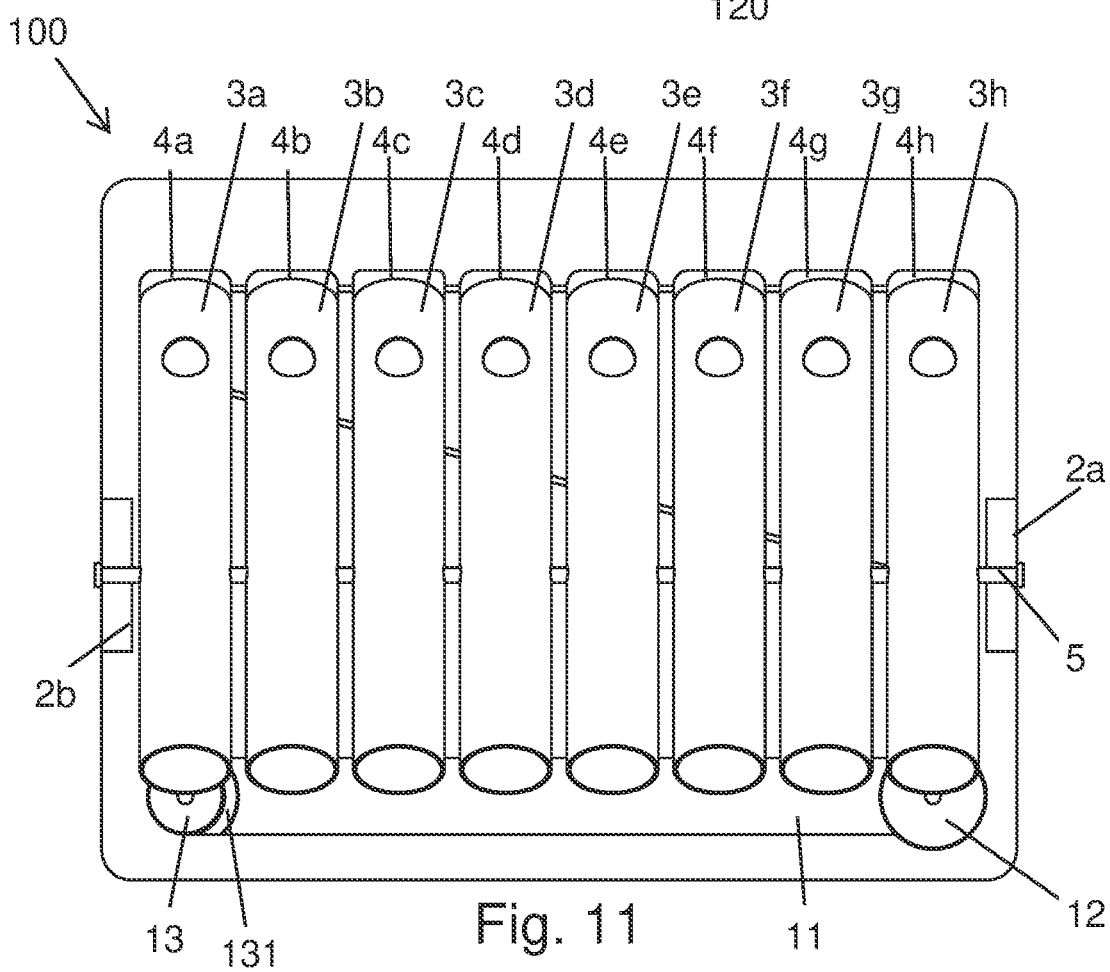
FIG. 11 shows a top view of the exemplary embodiment from FIG. 10.

If, for example, an animal treat 6 is hidden under the locking peg 13 from FIG. 10, which is located in front of the hollow body 3a, the animal is forced to first "clear" the locking pegs 13—here even up to seven—which are located to the right of the locking pegs 13 with the animal treat 6, out of the recess 11 via the pin receiving recess 111, for example, with one of its paws. Only then can it remove the last locking peg 13 in order to get to the animal treats 6 hidden underneath, which the animal has already perceived through the olfactory opening 130 in the locking peg 13.

A toy 100 according to the invention is particularly stable and easy to use. It offers many possible variations, since all hollow bodies 3a, ..., 3h or individual hollow bodies 3a, ..., 3h can be filled with animal treats in any order. Above all, a toy 100 according to the invention offers the animal a longer-term employment opportunity, even if the toy 100 only has a hollow body 3, since, by the emission of noises or tones when the closed end 32 of the respective hollow body 3 hits the base plate 1 or the sound element 4, noises are created which represent a permanent incentive to play. Furthermore, the animal's dexterity is promoted, since it must overcome the force of gravity in the respective hollow body 3a, ..., 3h with its snout or paw so that the hollow body tilts into the eating position and the animal delicacies 6 roll out.

The invention claimed is:

1. A toy for promoting the intelligence of animals, the toy comprising:
   a base plate, a connecting element, and holding elements projecting from said base plate and supporting said connecting element; and
   at least one elongated hollow body, having a closed end and an open end, and being formed for receiving small animal treats, said at least one hollow body being pivotably mounted on said connecting element about a longitudinal axis of said connecting element, and wherein:
   in an initial state, said closed end of said hollow body rests on a top of said base plate;
   said closed end of said hollow body tilts away from said base plate upon being actuated by the animal;
   said hollow body after an actuation by the animal of the hollow body automatically returns to the initial state; and
   an impact of said closed end of said hollow body onto the top of said base plate generates an audible sound; and
   at least one sound element arranged on the top of said base plate, the sound element being flat, and the at least one sound element being arranged on the top of said base plate in a support area of the closed end of the hollow body.

2. The toy according to claim 1, wherein said connecting element is an elongate body said hollow body returns to the initial state after a removal of a treat by the animal under an effect of gravity.

3. The toy according to claim 1, wherein said at least one holding element is one of two holding elements arranged opposite one another and projecting perpendicularly from said base plate, and said holding elements are connected to one another by way of said connecting element.

4. The toy according to claim 1, wherein said hollow body is a rocker arranged on said connecting element, wherein in the initial state the closed end of said hollow body rests on said base plate and said open end is spaced from said base plate.

5. The toy according to claim 1, wherein said at least one hollow body, when actuated by the animal, is tiltable under the effect of gravity around said connecting element in an eating position, the open end of the hollow body rests in the eating position on the top of said base plate so that animal treats located inside said hollow body move out of the hollow body under the effect of gravity.

6. The toy according to claim 1, wherein:
   the sound element is plate-shaped and has a rectangular base.

7. The toy according to claim 1, wherein:
   said hollow body is one of a plurality of hollow bodies which are arranged next to one another;
   a plurality of separate sound elements are arranged next to one another on the top of said base plate; and
   individual said hollow bodies on said connecting element and individual said sound elements on the top of said base plate are arranged with each hollow body being assigned a sound element.

8. The toy according to claim 1, wherein individual said sound elements have different lengths and/or different tones or pitches.

9. The toy according to claim 1, wherein said sound elements between said holding element are arranged by increasing length.

10. The toy according to claim 1, wherein said sound elements are formed of a material selected from the group consisting of wood, metal, and a metal alloy.

11. The toy according to claim 1, wherein at least one of said base plate, said holding elements, said connecting element, or said hollow bodies are formed of non-toxic materials selected from the group consisting of wood, plastic, and metal.

12. The toy according to claim 1, wherein said at least one hollow body has a cylindrical shape selected from the group consisting of elliptical and circular cross-sections, or a prismatic shape selected from the group consisting of a square, a rectangular, a hexagonal, and an octagonal cross-section.

13. The toy according to claim 1, wherein selected hollow bodies in a region of the closed end each have one olfactory opening, through which a smell of animal treats inside the hollow body can emanate.

14. The toy according to claim 13, wherein said olfactory opening is arranged in each case in a lateral surface of a respective said hollow body, and a center of said olfactory opening is arranged at a distance from the closed end amounting to 15-40% of a length of said hollow body.

15. The toy according to claim 1, wherein two openings are formed in a lateral surface of each hollow body opposite one another, at the same height, for passage of said connecting element, said openings being offset from the center of gravity of the respective said hollow body in a direction of said open end thereof.

16. The toy according to claim 15, wherein a center point of the openings is arranged in each case at a distance from the open end of 25-45% of a length of the respective hollow body.

17. The toy according to claim 1, wherein a distance between the open end of said hollow body and a pivot point of said hollow body around the connecting element is smaller than a distance between the pivot point and the closed end of said hollow body.

18. The toy according to claim 1, wherein said hollow body in the initial state encloses an angle of 25° to 60° with said base plate and/or said hollow body encloses an angle of 45° to 90° with said base plate in the eating position.

19. The toy according to claim 1, wherein said connecting element is connected with an end region of the respective said holding element remote from the top of said base plate.

20. The toy according to claim 19, wherein said connecting element is a rod element that is reversibly connected.

* * * * *